United States Patent
Webster et al.

(10) Patent No.: US 8,000,462 B2
(45) Date of Patent: Aug. 16, 2011

(54) SCREENING OF CALLS IN A PACKET-BASED NETWORK

(75) Inventors: Matthew J. Webster, Roseville, CA (US); Bruce E. LaVigne, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1706 days.

(21) Appl. No.: 11/203,362

(22) Filed: Aug. 12, 2005

(65) Prior Publication Data

US 2007/0041524 A1    Feb. 22, 2007

(51) Int. Cl.
*H04M 3/42*    (2006.01)
*H04M 1/64*    (2006.01)

(52) U.S. Cl. ............................. 379/215.01; 379/88.17

(58) Field of Classification Search ............... 379/88.26, 379/215.01, 88.17
See application file for complete search history.

(56) References Cited

U.S. PATENT DOCUMENTS

| | | | | |
|---|---|---|---|---|
| 4,277,649 A | * | 7/1981 | Sheinbein | 379/211.02 |
| 5,471,519 A | * | 11/1995 | Howe et al. | 379/88.26 |
| 5,533,103 A | * | 7/1996 | Peavey et al. | 379/69 |
| 5,651,054 A | * | 7/1997 | Dunn et al. | 379/88.11 |
| 5,652,789 A | * | 7/1997 | Miner et al. | 379/201.01 |
| 5,781,613 A | * | 7/1998 | Knuth et al. | 379/88.21 |
| 5,809,128 A | * | 9/1998 | McMullin | 379/215.01 |
| 5,835,573 A | * | 11/1998 | Dee et al. | 379/88.26 |
| 5,867,559 A | * | 2/1999 | Jorgensen et al. | 379/67.1 |
| 5,946,386 A | * | 8/1999 | Rogers et al. | 379/265.09 |
| 5,999,965 A | * | 12/1999 | Kelly | 709/202 |
| 6,496,501 B1 | * | 12/2002 | Rochkind et al. | 370/354 |
| 7,003,087 B2 | * | 2/2006 | Spencer et al. | 379/211.01 |
| 7,260,205 B1 | * | 8/2007 | Murphy et al. | 379/215.01 |
| 7,295,660 B1 | * | 11/2007 | Higginbotham et al. | 379/196 |
| 7,412,050 B2 | * | 8/2008 | Renner et al. | 379/215.01 |
| 7,602,895 B2 | * | 10/2009 | Terry et al. | 379/215.01 |

FOREIGN PATENT DOCUMENTS

GB    2353666    2/2001

OTHER PUBLICATIONS

VOIP Technology Backround, http://computer.howstuffworks.com/ip-telephony.htm, pp. 1-5.
State Intellectual Property Office, People's Republic of China. First Office Action. Date of Issue Aug. 6, 2010. Hewlett Packard Development Company L.P. Patent Application No. 200680038219.4. Application Date: Aug. 7, 2006.

\* cited by examiner

*Primary Examiner* — Joseph T Phan

(57) ABSTRACT

In a remote management messenger system (RMMS), a method for screening a packet-based call originated from a caller via a caller telecommunication device (CTD) to a receiver telecommunication device (RTD) via the RMMS. The method includes activating, if a receiver associated with the RTD does not respond to the packet-based call within a predetermined time period, an answering-and-recording function (ARF) associated with the RMMS to enable the ARF to receive and record packets pertaining to the packet-based call while permitting the receiver to continue to hear the caller. The method also includes, if the receiver responds to the packet-based call after the ARF is activated, permitting the receiver to continue the packet-based call with the caller.

21 Claims, 5 Drawing Sheets

SCREENING OF CALLS IN A PACKET-BASED NETWORK

BACKGROUND OF THE INVENTION

Advances in technology have ushered in the information age. Modern society now faces the challenge of balancing the desire to stay informed and be connected to one another (e.g., email, telephone, mail, video conferencing, etc.) while still maintaining a semblance of privacy. Methods and devices (e.g., email filters, spam filters, answering machines, caller ID, etc.) have been introduced to provide a person with the ability to control his/her privacy level.

A device that has become ubiquitous in the privacy endeavor is an answering machine. As discussed herein, an answering machine refers to a device with audio capability (e.g., speaker), which is locally situated to a telephone, capable of automatically responding to a telephone call (i.e., play a pre-recorded message) and receiving/recording messages. With the locally situated answering machine, a receiver may retrieve and respond to recorded messages at his/her convenience. Further, the receiver may employ the locally situated answering machine as a call screening device, while the answering machine is recording incoming messages. As discussed herein, call screening refers to the process of identifying a caller and his/her purposes before responding to a telecommunication request (i.e. telephone call).

Consider the situation wherein, for example, a receiver has been receiving a voluminous number of calls from telemarketers. Without a call-screening device (i.e., answering machine), the receiver may have to answer each telephone call in order to ascertain the validity of the telephone calls. Thus, the receiver may become quite wary with answering incoming telephone calls, particularly if a large percentage of the telephone calls are unwelcome by the receiver. However, by employing an answering machine, the receiver may call screen all his/her telephone calls and only interrupt the answering machine recording session if the incoming call is from a caller the receiver wishes to communicate with.

Generally, answering machines are utilized with telephones that employ circuit switching. As discussed herein, circuit switching refers to a telecommunication session between a caller's and a receiver's telephones in which a communication path is provisioned for regardless of communication activity between the two devices. In other words, a connection is maintained between the two devices for the entire duration of the session. Examples of circuit switching may include, but is not limited to, Public Switched Telephone Network (PSTN) and Integrated Services Digital Network (ISDN).

To facilitate discussion, FIG. 1 shows an example of circuit switching. A caller places a telephone call by picking up a telephone 102 and dialing a receiver's telephone number. The telephone call may be routed as a signal through a plurality of switches (104 and 106) to connect with a telephone 108 at the receiver's premise. The receiver may elect to establish a telecommunication session with the caller by personally responding to the telephone call. Alternatively, the receiver may allow an answering machine 110 to automatically respond to the telephone call by playing a pre-recorded outgoing message, and subsequently recording the incoming message.

Since circuit switching maintains a connection between the caller's telephone and the receiver's telephone/answering machine for the duration of the telecommunication session, the receiver may employ answering machine 110 as a call screening device. As long as answering machine 110 is recording, the target user may interrupt answering machine 110 to respond to the incoming telephone call. If the receiver elects not to interrupt the recording session, then the receiver may retrieve and respond to the recorded messages later at his/her convenience.

Note that the number of messages recorded/saved may depend upon the amount of memory space on an answering machine. If a receiver elects to have the answering machine automatically respond to all incoming telephone calls, the answering machine may "max out" its memory capacity; thus, the receiver may not receive all messages because of memory space limitations. Further, with finite storage capacity, answering machines typically do not provide for a backup system (e.g., memory space for temporarily holding deleted messages or duplicating the currently stored messages at another location to allow recovery in case of fire or other disaster); thus, the receiver may not be able to retrieve messages that have been accidentally deleted. Additionally in the case of power outage or "brown out," the ability to receive message or call screen may be disabled since most answering machines tend to rely on external power.

An alternative messaging system is a remote centralized server (RCS), such as voicemail, which has the capability of automatically responding to incoming telephone calls and recording/saving incoming messages to a dedicated memory space, similar to the aforementioned answering machine. The RCS is remote in that incoming messages are handled by a server (e.g., computer) that is generally located at a third-party location (e.g., such as the telephone provider). Also, the RCS is centralized in that the server is capable of managing telephone messages for a plurality of users. Further, RCS's storage capacity is usually expandable, allowing the users to increase available memory space without incurring unreasonable cost. In addition, the information on the server may be saved onto an external medium providing for a backup system, which may rely on redundant power to ensure constant uptime.

Unlike the aforementioned answering machines, RCSs are not limited to telephones that employ circuit switching. RCSs may be typically utilized with telephones that employ packet switching (e.g., Voice over Internet Protocol). As discussed herein, packet switching refers to a method in which data are broken into a plurality of packets and are sent through a packet-based network along the most expedient route to the destination (e.g., the receiver's telephone). Further, packet switching provides for a connection-oriented communication path, which is a virtual communication path that exists through a network to carry packets between two devices.

Packet switching technology has several advantages over circuit switching. With packet switching, a telephone call may be placed from any location that may have high-speed internet connectivity. Further, since packet switching may not require a dedicated line during a telecommunication session, packet switching technology tends to utilize fewer resources, thus allowing packet switching to be a lower-cost alternative to circuit switching.

FIG. 2 shows an example of packet switching with a RCS solution. A caller picks up a telephone 202 and dials a receiver's telephone number. The telephone number is routed as a plurality of packets through a plurality of routers (204 and 206) via an internet 208 to connect with a packet switch provider 210. From packet switch provider 210, a connection is made with a telephone 212 at the receiver's premise. Unlike circuit switching which maintains a connection between the two parties for the entire duration of the telecommunication session, packet switching does not provide for a continuous connection. If the receiver elects not to respond to the telephone call, the telephone call is disconnected from telephone 212, after a designated number of rings, and forwarded to a RCS 214, which is within packet switch provider 210. RCS 214, on the receiver's behalf, may play a pre-recorded outgoing message and may record any incoming message.

Once the receiver has relinquished control over the telecommunication session, a receiver is unable to differentiate between a dropped telephone call and a telephone call that has been forwarded to RCS. Since a connection is not established between the receiver and the RCS, the receiver is unable to conduct call screening since the incoming message may only be heard by the receiver after the RCS has completed the recording. As packet switching gains popularity as a low-cost telecommunication alternative to circuit switching, the inability to call screen is a challenge that has to be addressed in order to continue to empower modern society with the ability to maintain a semblance of privacy control.

SUMMARY OF INVENTION

The invention relates, in an embodiment, in a remote management messenger system (RMMS), a method for screening a packet-based call originated from a caller via a caller telecommunication device (CTD) to a receiver telecommunication device (RTD) via the RMMS. The method includes activating, if a receiver associated with the RTD does not respond to the packet-based call within a predetermined time period, an answering-and-recording function (ARF) associated with the RMMS to enable the ARF to receive and record packets pertaining to the packet-based call while permitting the receiver to continue to hear the caller. The method also includes, if the receiver responds to the packet-based call after the ARF is activated, permitting the receiver to continue the packet-based call with the caller.

In yet another embodiment, the invention relates to, in a remote management messenger system (RMMS), a method for screening a call originated from a caller telecommunication device (CTD) to a receiver telecommunication device (RTD). The call is routed as packets through a packet-based network for at least a portion of an end-to-end path between the CTD and the RTD. The call is also routed through the RMMS after being originated from the CTD. The method includes relaying first packets pertaining to the call from the RMMS to the RTD. The method also includes activating, if a receiver does not respond to the call by employing a response feature of the RTD within a predetermined time period, an answering-and-recording function (ARF) associated with the RMMS. The activating the ARF enables the ARF to receive second packets pertaining to the call from the CTD and to transmit third packets associated with a pre-recorded message from the ARF to the CTD via a first communication path between the ARF and the CTD. The second packets are received by the RMMS after an expiration of the predetermined time period. The activating the ARF further enables the RTD to also receive the second packets via a second communication path between the RMMS and the RTD. The method further includes, if the receiver employs the response feature of the RTD after the expiration of the predetermined time period, routing fourth packets between the CTD and the RTD. The fourth packets pertain to the call, thereby enabling the receiver to communicate using the RTD to the CTD, whereby the first packets are received prior to the expiration of the predetermined time period.

In yet another embodiment, the invention relates to an arrangement for screening a call originated from a caller telecommunication device (CTD) to a receiver telecommunication device (RTD). The call is routed as packets through a packet-based network for at least a portion of an end-to-end path between the CTD and the RTD. The call is also routed through the RMMS after being originated from the CTD. The arrangement includes a remote management messenger system (RMMS) configured to receive the call originated from the CTD. The RMMS is configured to route first packets pertaining to the call from the RMMS to the RTD. The RMMS also is configured to activate, if a receiver does not respond to the call by employing a response feature of the RTD within a predetermined time period, an answering-and-recording function (ARF). The activating the ARF enables the ARF to receive second packets pertaining to the call from the CTD and to transmit third packets associated with a pre-recorded message from the ARF to the CTD via a first communication path between the ARF and the CTD. The activating the ARF further enables the RTD to also receive the second packets via a second communication path between the ARF and the RTD. The RMMS also is configured to route fourth packets between the CTD and the RTD. The fourth packets pertain to the call, thereby enabling the receiver to communicate using the RTD to the CTD if the receiver employs the response feature of the RTD after an expiration of the predetermined time period, whereby the first packets are received prior to the expiration of the predetermined time period.

In yet another embodiment, the invention relates to an article of manufacture comprising a program storage medium having computer readable code embodied therein. The computer readable code is configured to enable screening of a call originated from a caller telecommunication device (CTD) to a receiver telecommunication device (RTD). The call is routed as packets through a packet-based network for at least a portion of an end-to-end path between the CTD and the RTD. The call is also routed through a remote management messenger system (RMMS) after being originated from the CTD. The article of manufacturing includes a computer readable code for relaying first packets pertaining to the call from the RMMS to the RTD. The article of manufacture includes a computer readable code for activating, if a receiver does not respond to the call by employing a response feature of the RTD within a predetermined time period, an answering-and-recording function (ARF) associated with the RMMS. The activating the ARF enables the ARF to receive second packets pertaining to the call from the CTD and to transmit third packets associated with a pre-recorded message from the ARF to the CTD via a first communication path between the ARF and the CTD. The second packets are received by the RMMS after an expiration of the predetermined time period. The activating the ARF further enables the RTD to also receive the second packets via a second communication path between the RMMS and the RTD. The article of manufacture also includes computer readable code for routing, if the receiver employs the response feature of the RTD after the expiration of the predetermined time period, fourth packets between the CTD and the RTD. The fourth packets pertain to the call, thereby enabling the receiver to communicate using the RTD to the CTD, whereby the first packets are received prior to the expiration of the predetermined time period.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

Figure 1:
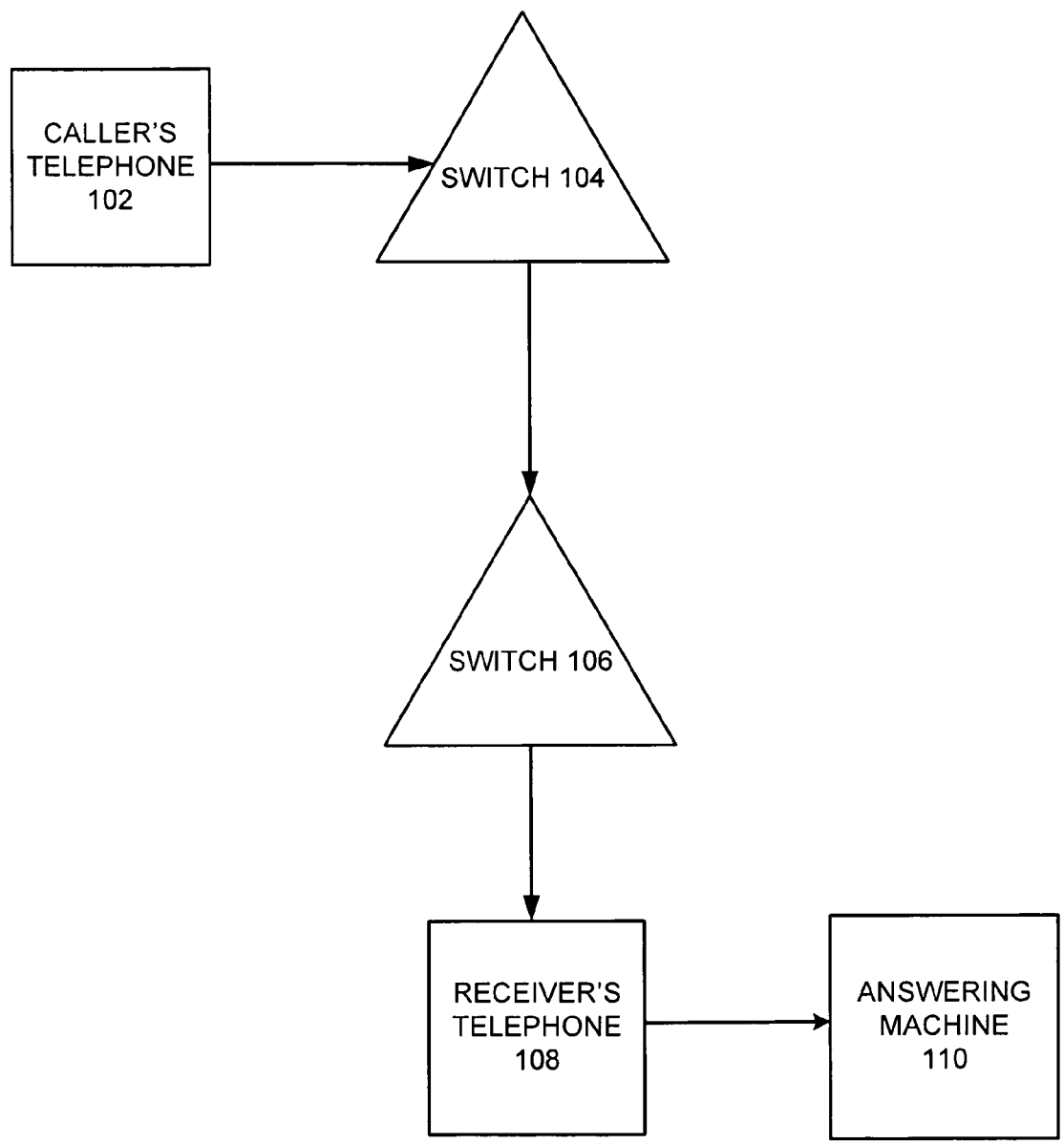
FIG. 1 shows an example of circuit switching.
Figure 2:
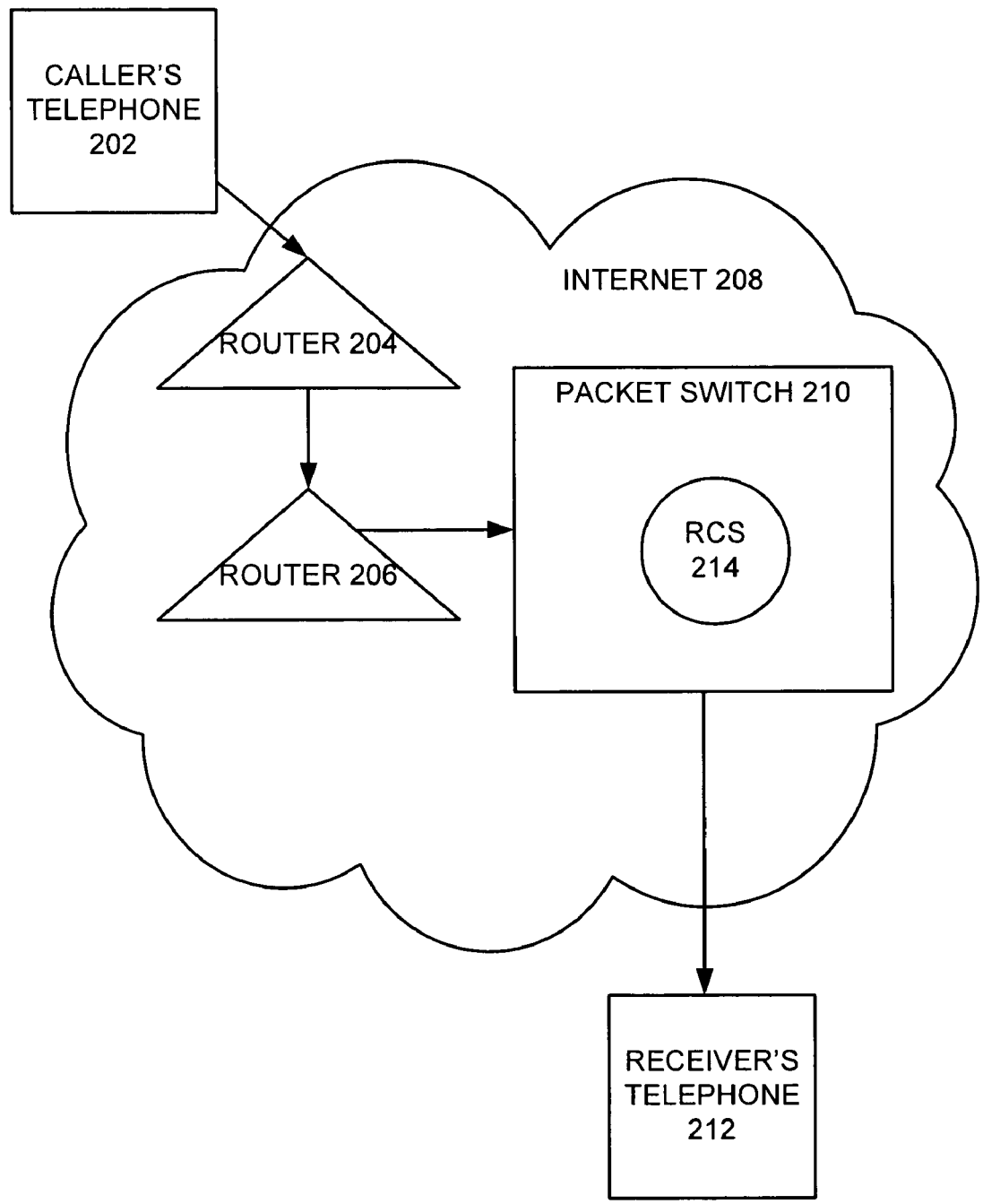
FIG. 2 shows an example of packet switching with a RCS solution.

The present invention will now be described in detail with reference to various embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

In accordance with embodiments of the present invention, there is provided a remote management messenger system (RMMS) designed to manage telecommunication sessions (e.g., telephone calls) over packet switching, such as Voice over Internet Protocol (VoIP). Embodiments of the invention provide for the RMMS to integrate software, hardware, and/or firmware to establish connections, automatically respond to telephone calls, record incoming messages, and provide call screening capabilities.

Consider the situation wherein, for example, a caller initiates a telecommunication session. The call may be routed as packets through a packet-based network for at least a portion of an end-to-end path (e.g., from a source to a destination) between the caller's telecommunication device (CTD) and the receiver's telecommunication device (RTD) through the RMMS. Examples of telecommunication device include, but are not limited to, telephones, multifunction convergence devices, personal digital assistants (PDAs), video-audio telephones, and computers equipped with appropriate VoIP software, microphones, audio devices, and sound cards.

Upon receiving the packets, an IP session is established between the RMMS and the CTD. As discussed herein, an IP session is a virtual connection between a source and a destination. Also, an IP session may be a connection-oriented communication path instead of a circuit-oriented communication path. As discussed herein, a connection-oriented communication path refers to a virtual communication path that exists through a network to carry packets between two devices. In other words, in a connection-oriented communication path, a dedicated path is not established between a caller and a receiver. In contrast, a circuit-oriented communication may be provisioned (i.e., may have a dedicated path) regardless of communication activity between the two devices.

In an embodiment, a call processor within the RMMS may manage the incoming telecommunication request (i.e., telephone call). As discussed herein, a call processor refers to software, hardware, and/or firmware that manages incoming telephone requests by mapping the packets to the correct IP addresses and keeping track of the status of the call. The call processor may then map the telephone number stored in the packets to a plurality of IP addresses.

In an embodiment, a receiver's telephone number may be mapped to a plurality of IP addresses. The mapping of the telephone number to IP addresses may be configurable by the receiver. The number of connections allowed may depend upon the number of IP addresses available. In an example, a receiver may have mapped his/her telephone number to three IP addresses, which may represent his/her telephone, computer, and audio device. Upon receiving an incoming telecommunication request, the call processor may establish IP sessions with all three devices in accordance with the receiver's configuration.

Upon receiving the telecommunication request, the RTD may alert the receiver about the incoming call. The receiver may conduct pre-screening through varying ring tones and/or caller-id information. In an embodiment, the receiver may have the ability to assign specific/unique ring tones to an individual caller or a caller group. Further, the caller-id information may be transmitted to the RTD, identifying the caller to the receiver.

Once the receiver signifies an intention to accept the call (e.g., picking up a telephone or pushing a button on a telephone), the RMMS may cancel the series of rings and establish a virtual connection between the CTD and the RTD. However, if the receiver is unable or unwilling to respond to the call, the ringing may continue until the ring timeout has expires (i.e., predetermined time period). At this point, the RMMS may cancel the rings and the call processor may terminate the first IP session between the RMMS and the RTD. The call processor may then establish a second IP session with an audio device (e.g., speaker) while an answering-and-recording function (ARF) associated with the RMMS is activated. Note that the connection between the CTD and the RMS may still be active.

In an embodiment, the audio device may be attached or located within proximity of the RTD. In an example, the RTD may be a combined telephone audio device (e.g., speakerphone). However, if the RTD does not include an audio device, an IP-based audio device may be employed to allow the receiver the ability to screen calls. As discussed herein, an IP-based audio device refers to an audio device that has an Ethernet connection that allows the audio device to receive data packets, some of which contain audio information to be converted to sound by the device.

Similar to the remote centralized server in the prior art, the ARF is a remote centralized server located at a third-party location (e.g., such as the telephone provider) capable of managing telephone messages for a plurality of users. Upon activation, the ARF may automatically respond to an incoming call (e.g., play a pre-recorded outgoing message to the caller) on the receiver's behalf and may subsequently record/save incoming messages from the caller. The messages may be saved onto memory space local to the RMMS or other memory devices (e.g., tapes, optical discs, CD ROMs, computers, etc.). The ARF's storage capacity is usually expandable, allowing the users to increase available memory space without incurring unreasonable cost. In an embodiment, the RMMS may perform disaster recovery, as offsite backup resources may be available and accessible by the RMMS. Further, the RMMS may be equipped with a redundant power supply to ensure constant uptime even when localities are affected by a power outage.

The IP session between the RMMS and the receiver's locally situated audio device may allow the receiver to hear the pre-recorded outgoing message and the incoming telephone messages, thereby allowing the receiver to conduct call screening. The receiver may interrupt the recording and personally respond to the telecommunication request, thereby disabling the ARF. At that point, the second IP session between the RMMS and the audio device may be disconnected (i.e., audio packets will cease being sent to the audio device) and a third IP session may be created between the RMMS and the RTD, which may allow a virtual connection between the CTD and the RTD. If the receiver does not interrupt the ARF, the recording session may continue until the caller terminates the call and/or the recording allotted time limit (i.e., recording predetermined time period) has expired.

Figure 3A:
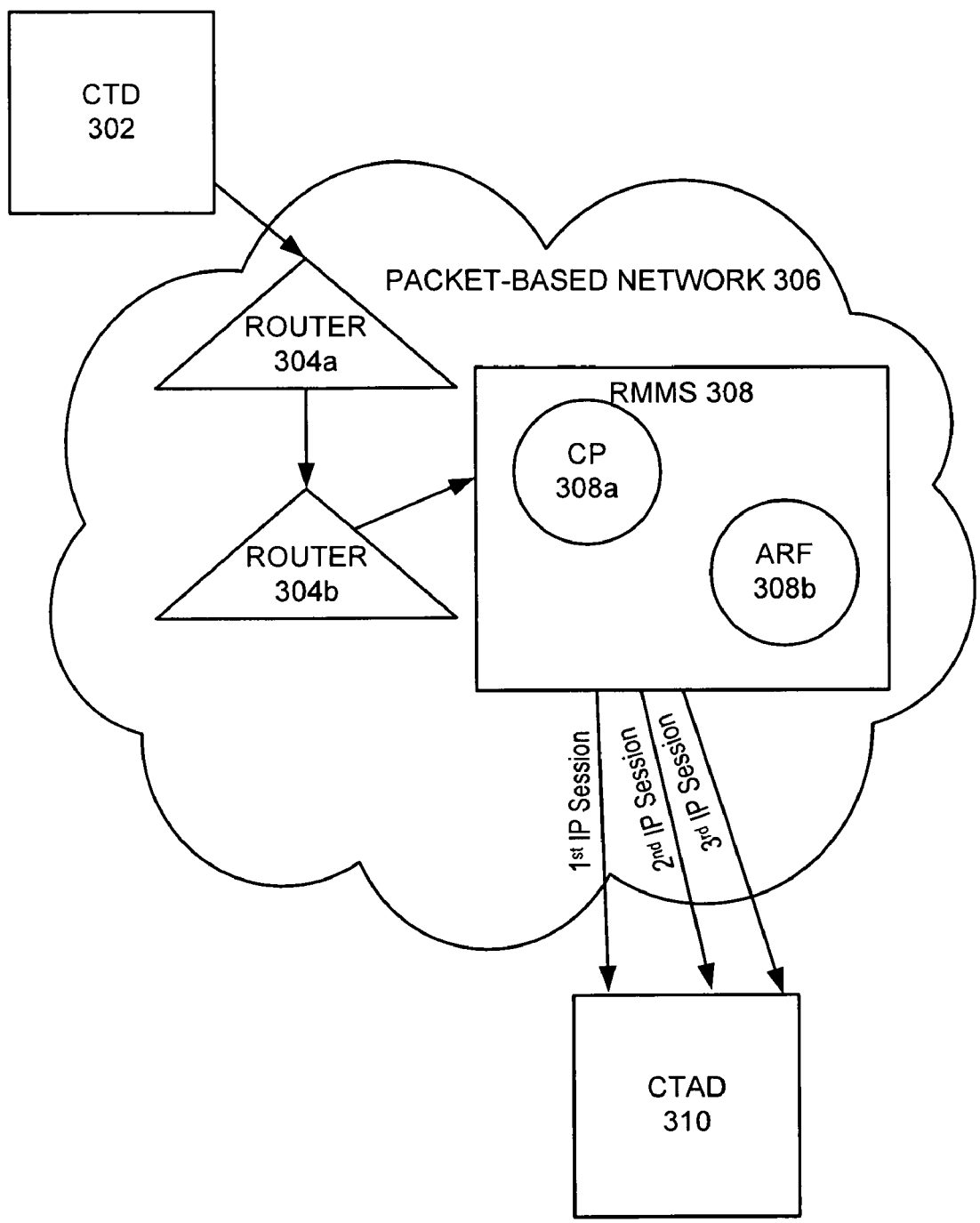
FIG. 3A represents, in an embodiment, a simple diagram of a remote management messenger system connected to a combined telecommunication audio device.

The features and advantages of embodiments of the invention may be better understood with reference to the figures and discussions that follow. FIG. 3A represents, in an embodiment, a simple diagram of a remote management messenger system (RMMS) connected to a combined telecommunication audio device (CTAD) (e.g., speakerphone). As discussed herein, a CTAD is a combined receiver's telecommunication device (RTD) with a speaker. A caller's telecommunication device (CTD) 302 sends a telecommunication request, which is routed as packets through a plurality of routers (304a and 304b) via a packet-based network 306 (e.g., internet), to a RMMS 308. A call processor 308a, which may manage the telecommunication request received by RMMS 308, may send the packets to the IP address associated with a CTAD 310 to establish an IP session between RMMS 308 and CTAD 310, thereby creating a virtual connection between CTD 302 and CTAD 310.

If the receiver does not respond to the telecommunication request and the ring timeout has expired, call processor 308a may terminate the first IP session between RMMS 308 and CTAD 310. Note that the connection between RMMS 308 and CTD 302 has not been terminated, even though ringing has ceased. Also, RMMS 308 may activate an ARF 308b, located within RMMS 308 to begin multicasting the pre-recorded message to the caller and the receiver and subsequently, to record the incoming messages. A second IP session may be established between RMMS 308 and CTAD 310 to allow the receiver to hear the pre-recorded message and call-screen the caller. In an embodiment, the second IP session that call processor 308a may establish between the RMMS and the CTAD may be sent to the same IP address; however, the UDP/TCP port numbers may have changed in order to differentiate the different CTAD functions.

While ARF 308b is active, the receiver may interrupt ARF 308b to establish a connection with the caller by activating a switch to signify his/her intention to accept the call (e.g., pushing a button on a telephone or picking up a telephone). An interrupt from the receiver may send a signal to call processor 308a to end the second IP session between RMMS 308 and CTAD 310 and to disable ARF 308b. Call processor 308a may establish a third IP session between RMMS 308 and CTAD 310, thereby establishing a virtual connection between CTD 302 and CTAD 310 for the duration of the call. If the receiver does not interrupt ARF 308b, the recording session may continue until the caller terminates the call and/or the recording allotted time limit (i.e., recording predetermined time period) has expired.

Alternatively, in an embodiment, instead of terminating the first IP session between RMMS 308 and CTAD 310 when the receiver does not respond to a call, call processor 308a may maintain the first IP session between RMMS 308 and CTAD 310. Further, if the receiver elects to interrupt ARF 308b, the first IP session may continue to be maintained while RMMS 308 may disable ARF 308b. In this embodiment, only one IP session may need to be established between RMMS 308 and CTAD 310.

Figure 3B:
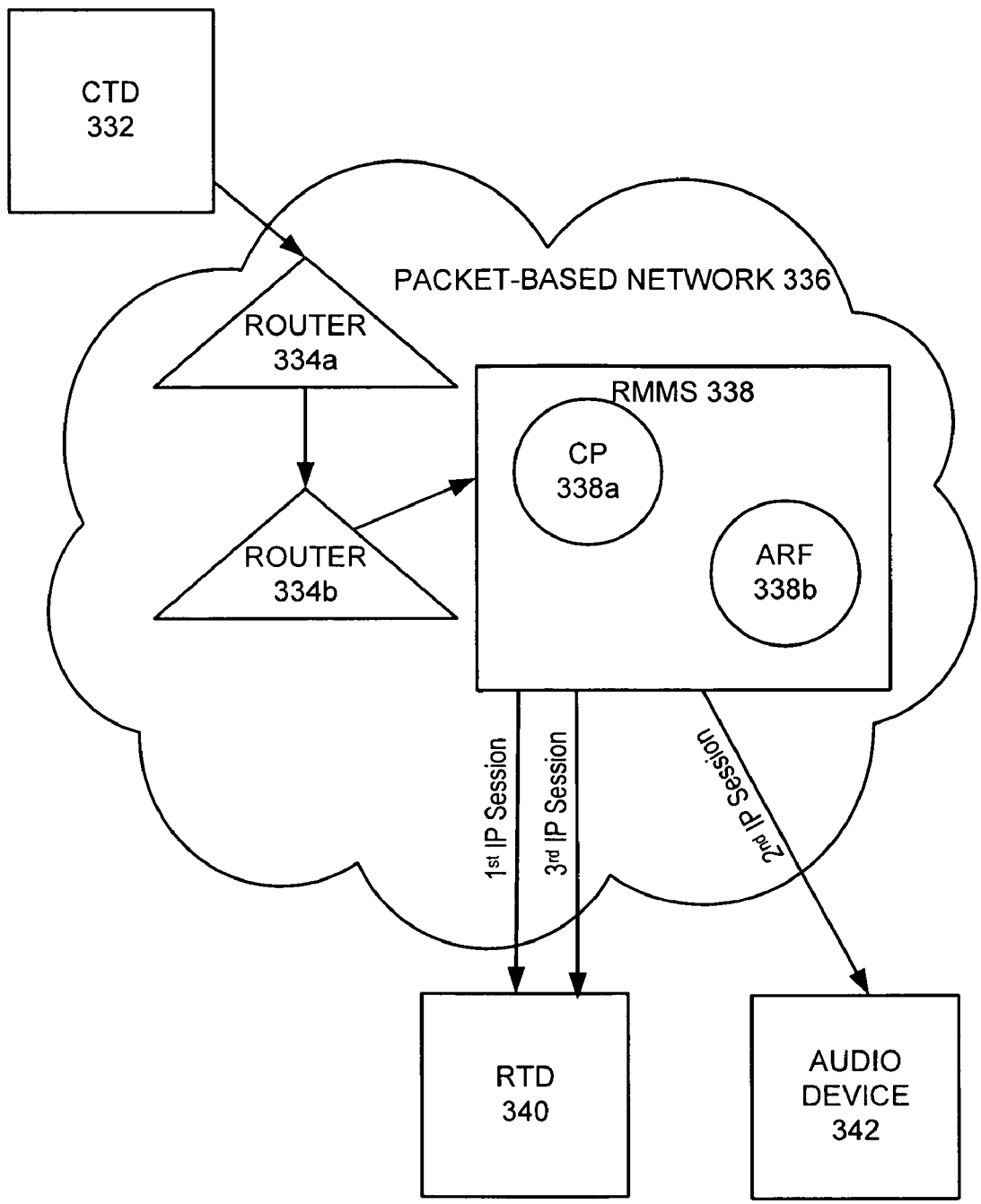
FIG. 3B represents, in accordance with an embodiment of the present invention, a simple diagram of a remote management messenger system connected to a telecommunication device with a separate IP-based audio device.

FIG. 3B represents, in accordance with an embodiment of the present invention, a simple diagram of RMMS connected to a telecommunication device with a separate IP-based audio device. A CTD 332 sends a telecommunication request, which is routed as packets through a plurality of routers (334a and 334b) via a packet-based network 336 to a RMMS 338. In an embodiment, a call processor 338a within RMMS 338 may send the packets to a plurality of IP addresses. The number of IP sessions made with RMMS 338 may depend upon the number of IP addresses mapped to the receiver's telephone number. The mapping of the telephone number to IP addresses may be configurable by the receiver.

In this example, the receiver's telephone number is mapped to two IP addresses, which may be his/her telephone and audio device. Upon receiving an incoming telecommunication request, call processor 338a may establish two separate IP sessions. The first IP session may be between RMMS 338 and a RTD 340 and the second IP session may be between RMMS 338 and an IP-based audio device 342. If the receiver responds to the call, a virtual connection may be established between the caller and the chosen device (e.g., telephone), and the other IP session (e.g., the connections between the RMMS and the computer) may be terminated.

If the receiver does not respond to the telecommunication request and the alert timeout has expired, call processor 338a may terminate the first IP session between RMMS 338 and RTD 340 while maintaining the second IP session between RMMS 338 and IP-based audio device 342. Note that the connection between RMMS 338 and CTD 332 may still be active. In an embodiment, call processor 338a may not establish a second IP session between RMMS 338 and IP-based audio device 342 until the receiver has declined to respond to the call. In this situation, call processor 338a may terminate the first IP session between RMMS 338 and RTD 340 and then establish a second IP session between RMMS 338 and IP-based audio device 342. The option of when an IP-based audio device is activated may be configurable by the receiver.

In an embodiment, RMMS 338 may also activate an ARF 338b to begin multicasting the pre-recorded message to the caller and receiver and subsequently, to record the incoming messages. IP-based audio device 342 may allow the receiver to hear the pre-recorded message and call-screen the caller. While ARF 338b is active, the receiver has the option of interrupting ARF 338b. An interrupt from the receiver may send a signal to call processor 338a to end the second IP session between RMMS 338 and IP-based audio device 342 and to disable ARF 338b. In addition, a third IP session may be establish between RMMS 338 and RTD 340, thereby creating a virtual connection between CTD 332 and RTD 340. If the receiver does not interrupt ARF 338b, the recording session may continue until the caller terminates the call and/or the recording allotted time limit (i.e., recording predetermined time period) has expired.

Figure 4:
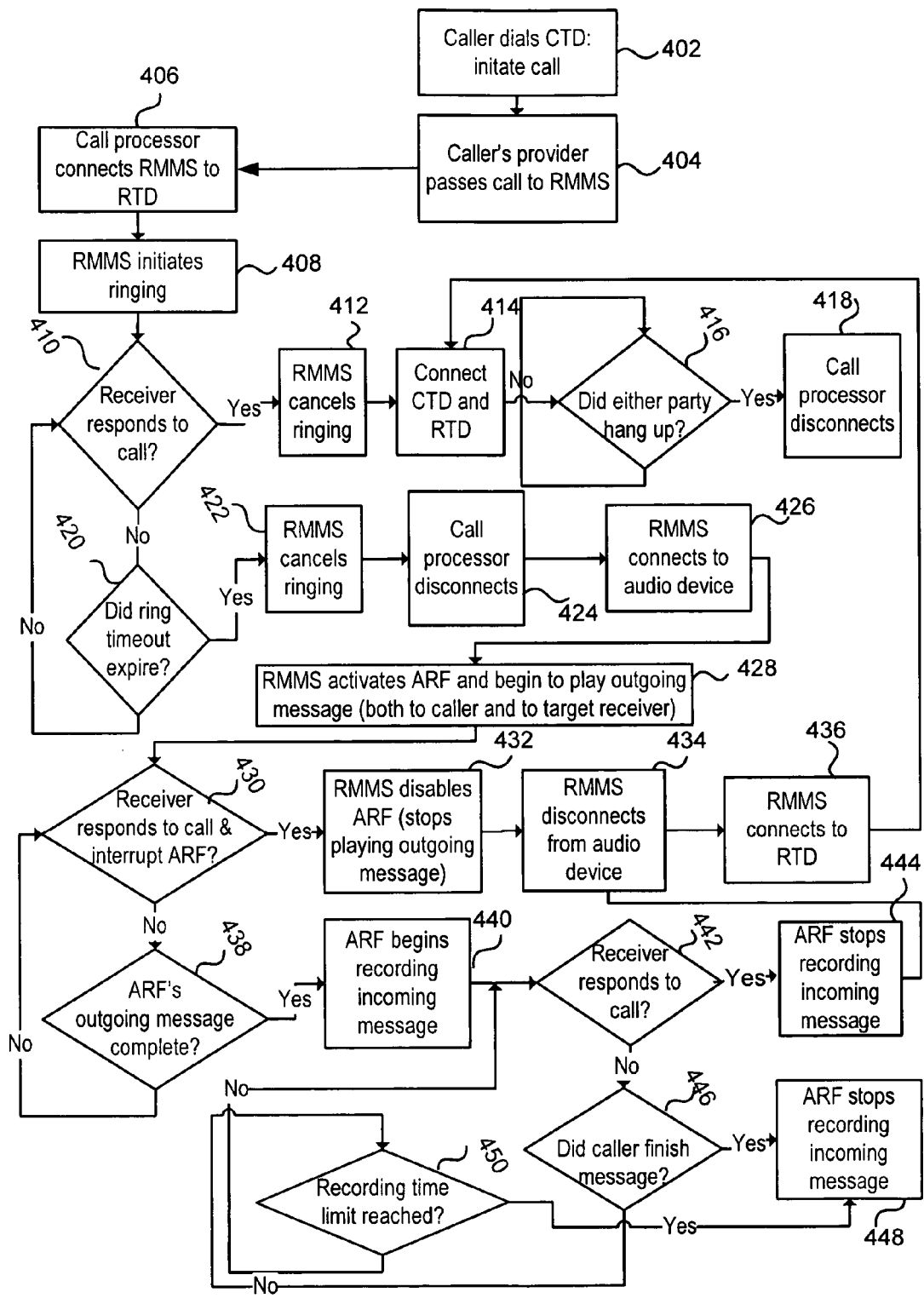
FIG. 4 represents, in an embodiment, a flowchart illustrating the steps for employing a remote management messenger system to manage a telecommunication request.

FIG. 4 represents, in an embodiment, a flowchart illustrating the steps for employing RMMS to manage a telecommunication request. At step 402, a caller makes a telecommunication request. The signal is sent from the caller's provider to the RMMS as packets via packet-based network (step 404). If the telecommunication request originates from a CTD on a circuit switch provider (e.g., PSTN), the signal may have to be converted to packets.

At step 406, the call processor may establish a plurality of IP sessions between the RMMS and the receiver's set of telecommunication devices. As mentioned above, the receiver's telephone number may be mapped to a plurality of IP addresses and/or UDP/TCP port numbers. The mapping of the telephone number to IP addresses and/or UDP/TCP port numbers may be configurable by the receiver. The number of connections allowed may depend upon the number of IP addresses and/or UDP/TCP port numbers available. Upon receiving an incoming telecommunication request, the call processor may establish a separate IP session for each telecommunication device.

At step 408, the RMMS may alert the receiver to the incoming telecommunication request. The receiver may conduct pre-screening through varying ring tones and/or caller-id information. In an embodiment, the series of rings may be configurable to produce varying tones depending upon the caller. For example, the rings may include but are not limited to bell chimes, knocking, and/or buzzing. Further, the caller-id information may be transmitted to the RTD, identifying the caller to the receiver.

At step 410, the receiver may respond to the telecommunication request. In which case, the RMMS may cancel the series of rings (step 412) and a virtual connection may be established between the CTD and the RTD (step 414). In an embodiment, if a plurality of IP sessions are established between the RMMS and the receiver's set of telecommunication devices, all IP sessions except the IP session between the RMMS and the chosen telecommunication device may be terminated. The virtual connection may continue until either party terminates the call (step 416), at which time, the call processor may end the connection between the CTD and the RTD (step 418).

If at step 410, the receiver does not respond to the call and the pre-determined series of rings have been met (step 420), the RMMS may cancel the ringing (step 422). The call processor may disconnect the RMMS from the first IP session with the RTD (step 424) and at step 426 may establish a second IP session between the RMMS and the receiver's locally situated audio device (e.g., speaker on the CTAD or IP-based speaker). In an embodiment, if both the RTD and the audio device have been activated, the call processor may terminate the first IP session between the RMMS and the RTD while maintaining the second IP session between the RMMS and the audio device.

If the RTD is a combined telecommunication audio device (CTAD), in an embodiment, the first IP session may be terminated and the second IP session may be established between the RMMS and the CTAD once the ringing timeout has expired. In another embodiment, the call processor may continue to maintain the first IP session between the RMMS and the combined telecommunication device as previously mentioned in FIG. 3A.

At step 428, the RMMS may activate an ARF, which may multicast (i.e., play) a pre-recorded outgoing message that may be audible to both the caller and the receiver. To send the pre-recorded outgoing message to both the CTD and the RTD, the message may be sent as packets, whereby the packets may be duplicated so that a first set of packets is sent with the IP address associated with the CTD and a second set of packets is sent with an IP address associated with the RTD.

At step 430, if the receiver decides to interrupt the ARF and responds to the call by activating a switch to signify his/her intention to accept the call (e.g., pushing a button on a telephone or picking up a telephone), the RMMS may disable the ARF (step 432). The receiver has the option to configure the outgoing message to stop or to continue playing once the receiver responds to a call. Also, the call processor may terminate the second IP session between the RMMS and the audio device (step 434) and may activate a third IP session between the RMMS and the RTD (step 436) to establish a virtual connection between the CTD and the RTD (step 414).

In an embodiment, if the RTD is a combined telecommunication audio device (CTAD), then a third IP session may be enabled between the RMMS and the CTAD after the second IP session has been terminated. In another embodiment, the call processor may maintain the IP session between the RMMS and the CTAD instead of disconnecting the second IP session and establishing a third IP session between the RMMS and the CTAD as previously mentioned in FIG. 3A.

However, if the receiver did not interrupt the ARF (step 430) and the ARF has completed multicasting the pre-recorded outgoing message (step 438), the ARF may begin recording the incoming message (step 440). During the recording session, the receiver may conduct call screening through the locally situated audio device. If the receiver elects to respond to the call (step 442), the RMMS may terminate the recording session by disabling the ARF (step 444). In an embodiment, the receiver has the option of configuring the ARF to continue the recording session even though the receiver may have elected to respond to the call.

The call processor may then terminate the IP session between the RMMS and the audio device (step 434) and establish an IP session between the RMMS and the RTD (step 436), thereby connecting the CTD to the RTD (step 414). The virtual connection may continue (step 416) until either party decides to terminate the session (step 418).

Alternatively at step 442, the receiver may elect not to respond to the call. The recording session may continue until the caller terminates the IP session (step 446) and/or the allotted recording time limit has expired (step 450). At step 448, the ARF may stop recording and the call processor may terminate all IP sessions.

As can be appreciated from embodiments of the invention, the RMMS empowers packet switch users with call-screening functionality, a feature that previously has been reserved for circuit switch user. Further, the present invention does not impose a requirement for the user to allocate additional resources (e.g., either memory or backup power) in order to enjoy the benefits of the RMMS. By integrating call screening functionality, the RMMS allows the packet switch user to regain control of privacy without compromising cost.

While this invention has been described in terms of several embodiments, there are alterations, permutations, and equivalents, which fall within the scope of this invention. It should also be noted that there are many alternative ways of implementing the methods and apparatuses of the present invention. In the claims that follow, terminologies such as first packets, second packets, and third packets, etc. do not necessarily imply a temporal sequence or require that the packets therein be consecutive packets. It is therefore intended that the following appended claims be interpreted as including all such alterations, permutations, and equivalents as fall within the true spirit and scope of the present invention.

What is claimed is:

1. In a remote management messenger system (RMMS), a method for screening a packet-based call originated from a caller via a caller telecommunication device (CTD) to a receiver telecommunication device (RTD), the RTD includes a telephone having a first IP address and a speaker having a second IP address, via the RMMS, comprising:

relaying first packets pertaining to the call from the RMMS to the RTD, including sending the first packets to the first IP address but not to the second IP address;

activating, if a receiver associated with the RTD does not respond to the packet-based call within a predetermined time period, an answering-and-recording function (ARF) associated with the RMMS to enable the ARF to receive and record packets pertaining to the packet-based call while permitting the receiver to continue to hear the caller, the activating the ARF enabling the ARF to receive second packets pertaining to the call from the CTD and to transmit third packets associated with a pre-recorded message from the ARF to the CTD wherein activating the ARF results in the third packets being sent to the second IP address but not to the first IP address; and if the receiver responds to the packet-based call after the ARF is activated, permitting the receiver to continue the packet-based call with the caller, wherein the RMMS is configured to communicate with the telephone and the speaker via the first and second IP addresses, respectively.

2. The method of claim 1 further comprising interrupting the recording function of the ARF if the receiver responds to the packet based call after the ARF is activated.

3. The method of claim 1 wherein the receiver responds to the packet-based call after the ARF is activated by activating a switch on the telephone to signify an intention of the receiver to receive the packet-based call.

4. The method of claim 3 wherein the activating the switch represents picking up the telephone.

5. The method of claim 3 wherein the activating the switch represents pushing a button on the telephone.

6. The method of claim 1 wherein the activating the ARF results in the RMMS communicating with the speaker but not with the telephone.

7. In a remote management messenger system (RMMS), a method for screening a call originated from a caller telecommunication device (CTD) to a receiver telecommunication device (RTD), the RTD includes a telephone having a first IP address and a speaker having a second IP address, the call being routed as packets through a packet-based network for at least a portion of an end-to-end path between the CTD and the RTD, the call being routed through the RMMS after being originated from the CTD, comprising:

relaying first packets pertaining to the call from the RMMS to the RTD, including sending the first packets to the first IP address but not to the second IP address;

activating, if a receiver does not respond to the call by employing a response feature of the RTD within a predetermined time period, an answering-and-recording function (ARF) associated with the RMMS, the activating the ARF enabling the ARF to receive second packets pertaining to the call from the CTD and to transmit third packets associated with a pre-recorded message from the ARF to the CTD via a first communication path between the ARF and the CTD wherein activating the ARF results in the third packets being sent to the second IP address but not to the first IP address, the second packets being received by the RMMS after an expiration of the predetermined time period, the activating the ARF further enabling the RTD to also receive the second packets via a second communication path between the RMMS and the RTD; and if the receiver employs the response feature of the RTD after the expiration of the predetermined time period, routing fourth packets between the CTD and the RTD, the fourth packets pertaining to the call, thereby enabling the receiver to communicate using the RTD to the CTD, whereby the first packets are received prior to the expiration of the predetermined time period, wherein the RMMS is configured to communicate with the telephone and the speaker via the first and second IP addresses, respectively.

8. The method of claim 7 further comprising interrupting at least one of transmitting the pre-recorded message using the ARF and recording a message from a caller associated with the CTD using the ARF if the receiver employs the response feature of the RTD after the expiration of the predetermined time period.

9. The method of claim 7 wherein the response feature represents activating a switch on the telephone to signify an intention of the receiver to receive the call.

10. The method of claim 9 wherein the activating the switch represents picking up the telephone.

11. The method of claim 9 wherein the activating the switch represents pushing a button on the telephone.

12. The method of claim 7 wherein the first communication path and the second communication path represent connection-oriented communication paths.

13. The method of claim 7 wherein the relaying the first packets including sending the first packets to both the first IP address and the second IP address.

14. An arrangement for screening a call originated from a caller telecommunication device (CTD) to a receiver telecommunication device (RTD), the RTD includes a telephone having a first IP address and a speaker having a second IP address, the call being routed as packets through a packet-based network for at least a portion of an end-to-end path between the CTD and the RTD, the call being routed through the RMMS after being originated from the CTD, comprising:

a remote management messenger system (RMMS) configured to receive the call originated from the CTD, the RMMS being configured to route first packets pertaining to the call from the RMMS to the RTD including sending the first packets to the first IP address but not to the second IP address, the RMMS also being configured to activate, if a receiver does not respond to the call by employing a response feature of the RTD within a predetermined time period, an answering-and-recording function (ARF), the activating the ARF enabling the ARF to receive second packets pertaining to the call from the CTD and to transmit third packets associated with a pre-recorded message from the ARF to the CTD via a first communication path between the ARF and the CTD wherein activating the ARF results in the third packets being sent to the second IP address but not to the first IP address, the activating the ARF further enabling the RTD to also receive the third packets via a second communication path between the ARF and the RTD, the RMMS also being configured to route fourth packets between the CTD and the RTD, the fourth packets pertaining to the call, thereby enabling the receiver to communicate using the RTD to the CTD if the receiver employs the response feature of the RTD after an expiration of the predetermined time period, whereby the first packets are received prior to the expiration of the predetermined time period, wherein the RMMS is configured to communicate with the telephone and the speaker via the first and second IP addresses, respectively.

15. The arrangement of claim 14 wherein the RMMS is configured to interrupt at least one of transmitting the pre-recorded message using the ARF and recording a message from a caller associated with the CTD using the ARF if the receiver activates the response feature of the RTD after the expiration of the predetermined time period.

16. The arrangement of claim 14 wherein the first communication path and the second communication path represent connection-oriented communication paths.

17. The arrangement of claim 14 wherein the relaying the first packets including sending the first packets to both the first IP address and the second IP address.

18. An article of manufacture comprising a program storage medium having computer readable code embodied therein, the computer readable code being configured to enable screening of a call originated from a caller telecommunication device (CTD) to a receiver telecommunication device (RTD), the RTD includes a telephone having a first IP address and a speaker having a second IP address, the call being routed as packets through a packet-based network for at least a portion of an end-to-end path between the CTD and the RTD, the call being routed through a remote management messenger system (RMMS) after being originated from the CTD, comprising:

computer readable code for relaying first packets pertaining to the call from the RMMS to the RTD including sending the first packets to the first IP address but not to the second IP address;

computer readable code for activating, if a receiver does not respond to the call by employing a response feature of the RTD within a predetermined time period, an answering-and-recording function (ARF) associated with the RMMS, the activating the ARF enabling the ARF to receive second packets pertaining to the call from the CTD and to transmit third packets associated with a pre-recorded message from the ARF to the CTD via a first communication path between the ARF and the CTD wherein activating the ARF results in the third packets being sent to the second IP address but not to the first IP address, the second packets being received by the RMMS after an expiration of the predetermined time period, the activating the ARF further enabling the RTD to also receive the second packets via a second communication path between the RMMS and the RTD; and computer readable code for routing, if the receiver employs the response feature of the RTD after the expiration of the predetermined time period, fourth packets between the CTD and the RTD, the fourth packets pertaining to the call, thereby enabling the receiver to communicate using the RTD to the CTD, whereby the first packets are received prior to the expiration of the predetermined time period, wherein the RMMS is configured to communicate with the telephone and the speaker via the first and second IP addresses, respectively.

19. The article of manufacture of claim 18 further comprising computer readable code for interrupting at least one of transmitting the pre-recorded message using the ARF and recording a message from a caller associated with the CTD using the ARF if the receiver employs the response feature of the RTD after the expiration of the predetermined time period.

20. The article of manufacture of claim 18 wherein the first communication path and the second communication path represent connection-oriented communication paths.

21. The article of manufacture of claim 18 wherein the relaying the first packets including sending the first packets to both the first IP address and the second IP address.

* * * * *